US009122689B1

United States Patent
Bono et al.

(10) Patent No.: US 9,122,689 B1
(45) Date of Patent: Sep. 1, 2015

(54) RECOVERING PERFORMANCE OF A FILE SYSTEM POST-MIGRATION

(71) Applicant: EMC Corporation, Hopkinton, MA (US)

(72) Inventors: Jean-Pierre Bono, Westborough, MA (US); Philippe Armangau, Acton, MA (US); Marc DeSouter, Wayne, NJ (US); William Davenport, Burlington, MA (US); Morgan Clark, South Orange, NJ (US); Michael D. Schouten, Lake Katrine, NY (US)

(73) Assignee: EMC Corporation, Hopkinton, MA (US)

( * ) Notice: Subject to any disclaimer, the term of this patent is extended or adjusted under 35 U.S.C. 154(b) by 211 days.

(21) Appl. No.: 13/832,695

(22) Filed: Mar. 15, 2013

(51) Int. Cl.
*G06F 17/30* (2006.01)

(52) U.S. Cl.
CPC .... *G06F 17/30079* (2013.01); *G06F 17/30067* (2013.01)

(58) Field of Classification Search
CPC .................... G06F 17/30079; G06F 17/30067
USPC ........................ 707/633, 634, 635
See application file for complete search history.

(56) References Cited

U.S. PATENT DOCUMENTS

| 7,010,554 | B2 * | 3/2006 | Jiang et al. ............................ 1/1 |
| 8,117,151 | B2 | 2/2012 | Nakatani et al. |
| 8,484,161 | B2 | 7/2013 | Baker et al. |
| 8,606,751 | B1 * | 12/2013 | Starling et al. ................ 707/634 |
| 2003/0191745 | A1 * | 10/2003 | Jiang et al. ........................ 707/2 |
| 2005/0240628 | A1 * | 10/2005 | Jiang et al. ................. 707/104.1 |
| 2012/0303913 | A1 | 11/2012 | Kathmann et al. |

OTHER PUBLICATIONS

Sunil Sarin et al., A Flexible Algorithm for Replicated Directory Management, 1989, IEEE, 456-464.*

\* cited by examiner

*Primary Examiner* — Jean B Fleurantin
(74) *Attorney, Agent, or Firm* — BainwoodHuang

(57) ABSTRACT

An improved technique involves providing a pair of inode numbers in a directory entry for a file in a directory of a target file system. Along these lines, the target file system writes a first inode number and a second inode number to the directory entry for the file. While the client has not yet remounted its file system, that client may continue to use the file handle provided for the original file system. The data storage system continues to refer to a mapping table that cross-references initial inode numbers to target ones, at some cost in performance. Nevertheless, the client has an option to remount the file system at a time that is convenient to the client, so that the client may obtain a new handle. The client may subsequently use the new file handle to access the file.

17 Claims, 6 Drawing Sheets

RECOVERING PERFORMANCE OF A FILE SYSTEM POST-MIGRATION

BACKGROUND

Data storage systems use file systems for organizing files stored on disks or electronic flash drives (EFDs). Each file system has an associated inode table, which stores block locations on the disks or EFDs where the files of the file system are stored. Each file or subdirectory has an inode number in the inode table. The inode number uniquely identifies the file in the file system. A file system may include multiple directories. A directory is a structure that provides mappings between the names of files and inode numbers. These mapping are stored in directory entries for the file, which, for any given file, store both the filename of the file and its inode number. When a client requests access to a file in a directory, the file system looks up the directory entry for the file and obtains the file's inode number. The file system can then access the contents of the file at the block locations designated by the file's inode.

When a client requests access to a file, the data storage system provides the client with an access handle that contains the inode number for the file. For example, in the Network File System (NFS), a file handle contains the inode number for the file, as well as a file system identifier and a versioning identifier that identifies the latest version of the file. The client uses the access handle for subsequent requests to access the file directly by inode number; in this way, the file can be accessed directly, without requiring a directory lookup.

At some point in time, an administrator of the storage system may need to migrate the file system from an initial file system to a target file system. In such a case, the newer file system typically uses different inode numbers for the files as were used in the initial file system. File handles obtained from the initial file system will thus not be able to locate file contents, as the inode numbers in the handles no longer point to the same files.

In order for a client to access files in the target file system using file handles, a conventional file system migration scheme involves rebooting the client. In this way, after rebooting, the client is able to receive new handles with valid inode numbers in the target file system. That is, when the client requests a new handle after migration, the operating system in which the target file system is installed looks up the file in the file's directory, locates the filename in the directory entry, and obtains the corresponding inode number. The data storage system then sends the client a new file handle with new the inode number as obtained from the directory entry.

SUMMARY

Unfortunately, forcing a client to reboot during migration can be disruptive. For example, the client may run applications that require constant operation for long periods of time, e.g., a week or a month. In such a case, forcing the client to reboot upon migration will force the client to shut down such an application.

A previous solution to this problem, described in U.S. Ser. No. 13/338,619, "Caching Metadata of Logical Views of Storage," involves creating a mapping table to be stored on disk. The mapping table maps inode numbers of the initial file system to inode numbers of the target file system. Directory entries in the target file system continue to store inode numbers for the original file system. In this way, the client may continue to access the files using the file handles that the client obtained for the initial file system.

That said, the performance of the target file system is somewhat reduced when the client uses these initial inode numbers, as the initial file system needs to access the mapping table and perform a lookup operation in order to obtain the inode number. Moreover, there is no apparent way to recover from this reduction in performance. That is, the target file system may continue to use the mapping table indefinitely.

In contrast to conventional file system migration schemes, in which an administrator of the data storage system must choose between disrupting the client during migration and sustaining a reduction in file system performance post-migration, an improved technique involves providing a pair of inode numbers in a directory entry for a file in a directory of a target file system. Along these lines, the target file system writes a first inode number and a second inode number to the directory entry for the file. While the client has not yet remounted its file system, that client may continue to use the file handle provided for the original file system. The data storage system continues to refer to a mapping table that cross-references initial inode numbers to target ones, at some cost in performance. Nevertheless, the client has an option to remount the file system, typically through a reboot and at a time that is convenient to the client, so that the client may obtain a new handle. Obtaining a new handle involves a new directory lookup and access to the second inode number valid in the target file system. The client may subsequently use the new file handle to access the file. Also, the mapping table may be deleted, as cross-references from original to target inode numbers are no longer required.

Advantageously, the improved technique allows for flexibility in handling file system migration. The client may decide not to remount the file system and to accept the cost of reduced file access performance. The client may make this choice knowing that it may recover full performance by remounting later. This option to remount post-migration allows the client to run applications for as long as needed without disruption. It also allows for those performing the migration to proceed without concern that they might disrupt applications that the clients may be running during the migration.

One embodiment of the improved technique is directed to a method of managing a migration of a directory object from a first file system to a second file system. The method includes copying the directory object from the first file system to the second file system. The method also includes writing a first inode number and a second inode number to a directory entry for the directory object in a directory of the second file system, the first inode number providing an inode number of the directory object in the first file system, the second inode number providing an inode number of the directory object in the second file system. The method further includes receiving, from a client, a first request to access the directory object, the first request including a handle for the directory object obtained prior to migration and including the first inode number. The method further includes locating the inode of the directory object in the second file system using the handle. The method still further includes receiving a second request to access the directory object. The method also includes sending a file handle to the client that contains the second inode number after a file system remounting operation on the client.

Additionally, some embodiments of the improved technique are directed to a system constructed and arranged to manage a migration of a directory object from a first file system to a second file system. The system includes a network interface, memory, and a controller including controlling circuitry constructed and arranged to carry out the method of managing a migration of directory object from a first file system to a second file system.

Furthermore, some embodiments of the improved technique are directed to a computer program product having a non-transitory computer readable storage medium which stores code including a set of instructions to carry out the method of managing a migration of a directory object from a first file system to a second file system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves providing a pair of inode numbers in a directory entry for a file in a directory of a target file system. Along these lines, the target file system writes a first inode number and a second inode number to the directory entry for the file. While the client has not yet remounted its file system, that client may continue to use the file handle provided for the original file system. The data storage system continues to refer to a mapping table that cross-references initial inode numbers to target ones, at some cost in performance. Nevertheless, the client has an option to remount the file system, typically through a reboot and at a time that is convenient to the client, so that the client may obtain a new handle. Obtaining a new handle involves a new directory lookup and access to the second inode number valid in the target file system. The client may subsequently use the new file handle to access the file. Also, the mapping table may be deleted, as cross-references from original to target inode numbers are no longer required.

Figure 1:
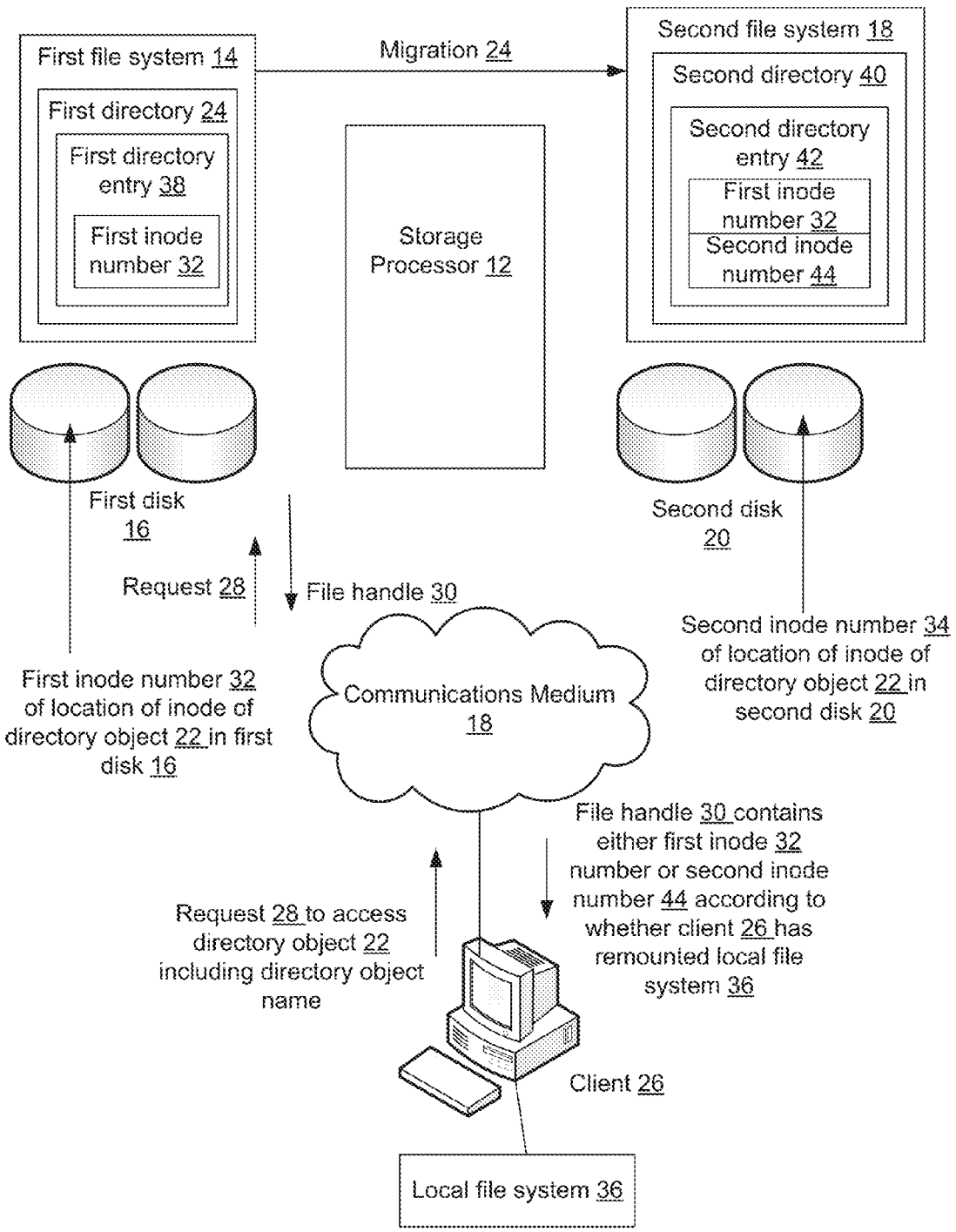
FIG. 1 is a block diagram illustrating an example electronic environment for carrying out the improved technique.

FIG. 1 illustrates an example electronic environment 10 for carrying out the improved technique. Electronic environment 10 includes storage processor 12, first disk array 16, second disk array 20, communications medium 18, and client 26.

Communication medium 18 provides network connections between storage processor 12 and client 26. Communications medium 18 may implement a variety of protocols such as Fibre Channel, iSCSI, CIFS, NFS, SMB 3.0, combinations thereof, and the like. Furthermore, communications medium 18 may include various components (e.g., cables, switches/ routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Storage processor 12 is constructed and arranged to manage data stored in first disk 16 and second disk 20. Storage processor 12 is also constructed and arranged to write a pair of inode numbers into a directory entry for a file, a first inode number for the physical location on disk 20 of the inode number of the file in the second file system, post-migration, a second inode number for the location on disk 16 of the inode number of the file in a previous file system. Storage processor 12 is further constructed and arranged to create and send a file handle for the file to client 26. The file handle contains either the first or second inode number according to whether client 26 has remounted the file system since migration. Storage processor 12 is a server blade in a chassis of a data storage system; nevertheless, in some arrangements, storage processor may be a personal computer, a laptop, or the like.

It should be understood that, in some arrangements, storage processor 12 manages data in second disk 20, while another storage processor manages data in first disk 16. In such cases, the migration process involves moving data from first storage 16 to second storage 20. For example, the migration involves an upgrade of components to storage processor 12 in order to manage a 64-bit file system, rather than a 32-bit file system.

First disk 16 and second disk 20 are each configured to store data for files in blocks at locations that are recorded in the inodes for those files. In the discussion that follows, data in files have been migrated from first disk 16 to second disk 20 according to the migration of file system 14 to files system 18.

In an example, first file system 14 is a 32-bit file system; that is, the addresses used to describe locations of blocks in first disk array 16 have 32 bits. Additionally, second file system 18 is a 64-bit file system. In some arrangements, each file system may take on other characteristics.

Client 26 is constructed and arranged to access files stored on either the first disk array 16 pre-migration or second disk array 20 post-migration. Client 26 is a desktop computer, although in some arrangements, client 26 may be a server, a laptop, a mobile device, or the like having a processor and an ability to access files over a network.

Prior to operation, data on first disk array 16 and corresponding first file system 14 was migrated to second disk array 20 and second file system 18, respectively. This means that directory objects stored in first disk array 16 are copied to second disk array 20. Because of various circumstances including an inability to reserve inode numbers in second file system 18 (because the blocks located at those numbers might be used as a temporary scratch pad, for instance), inode numbers used in first file system 14 will not be valid in second file system 18. This means that file handles that client 26 uses for accessing files in first file system 14 that contain inodes valid in first file system 14 will not be useful for accessing files in second file system 18. As a partial alleviation of this problem, storage processor 12 creates a mapping table (see FIG. 2) for mapping inode numbers 32 valid in first file system 14 to inode numbers 44 valid in second file system 18.

During operation and post-migration, storage processor 12 writes, for each file in second directory 40, a first inode number 32 valid in first file system 14 and a second inode number 44 valid in second file system 18. In some arrangements, storage processor 12 differentiates between these inode numbers by placing the second inode number 44 in a location within second directory entry 42 adjacent to a hole in a leaf in a branch of second directory 40. Advantageously, placing second inode number 44 in such a location in second directory entry 42 potentially allows for a large contiguous empty space in disk when storage processor deletes second inode number 44. Further details about such placement of second inode number 44 will be discussed below with respect to FIG. 5.

Sometime later, storage processor 12 receives a request 28 to access a file 22 that contains a filename. In many cases, storage processor 12 has knowledge of whether client 26 has remounted its file system since migration. In some arrangements, however, storage processor 12 verifies whether client 26 has remounted its file system since the migration. If client 26 has not yet remounted, then storage processor 12 extracts first inode number 32 from second directory entry 42 and creates a file handle 30 that contains first inode number 32. In some further arrangements, storage processor 12 also performs a lookup operation on a mapping table (see FIG. 2) to find the inode number of the inode for file 22 in second file system 18.

If client 26, on the other hand, has remounted since migration, then storage processor 12 extracts second inode number 44 from second directory entry 42 and creates file handle 30 that contains second inode number 44. In some arrangements, storage processor 12 also locates the contents of file 22 from the inode at second inode number 44.

Storage processor then sends file handle 30 to client 26 for subsequent access to file 22. Client 26 now has a valid file handle regardless of whether or not it has remounted. If file handle 30 contains first inode number 32 and then client 26 remounts, then upon the subsequent first request for access to file 22 since remounting, storage processor 12 sends client 26 a new file handle 30 containing second inode number 44. The migration process is completely transparent to client 26 in terms of being able to access file 22.

It should be understood that there are several ways in which storage processor 12 may be enabled to determine whether client 26 has remounted its file system since migration. For example, in some arrangements, storage processor 12 receives a message that client 26 has remounted and keeps a record of that remounting in a database stored in second disk array 20. Further details of this decision process are described below with respect to FIG. 2.

Figure 2:
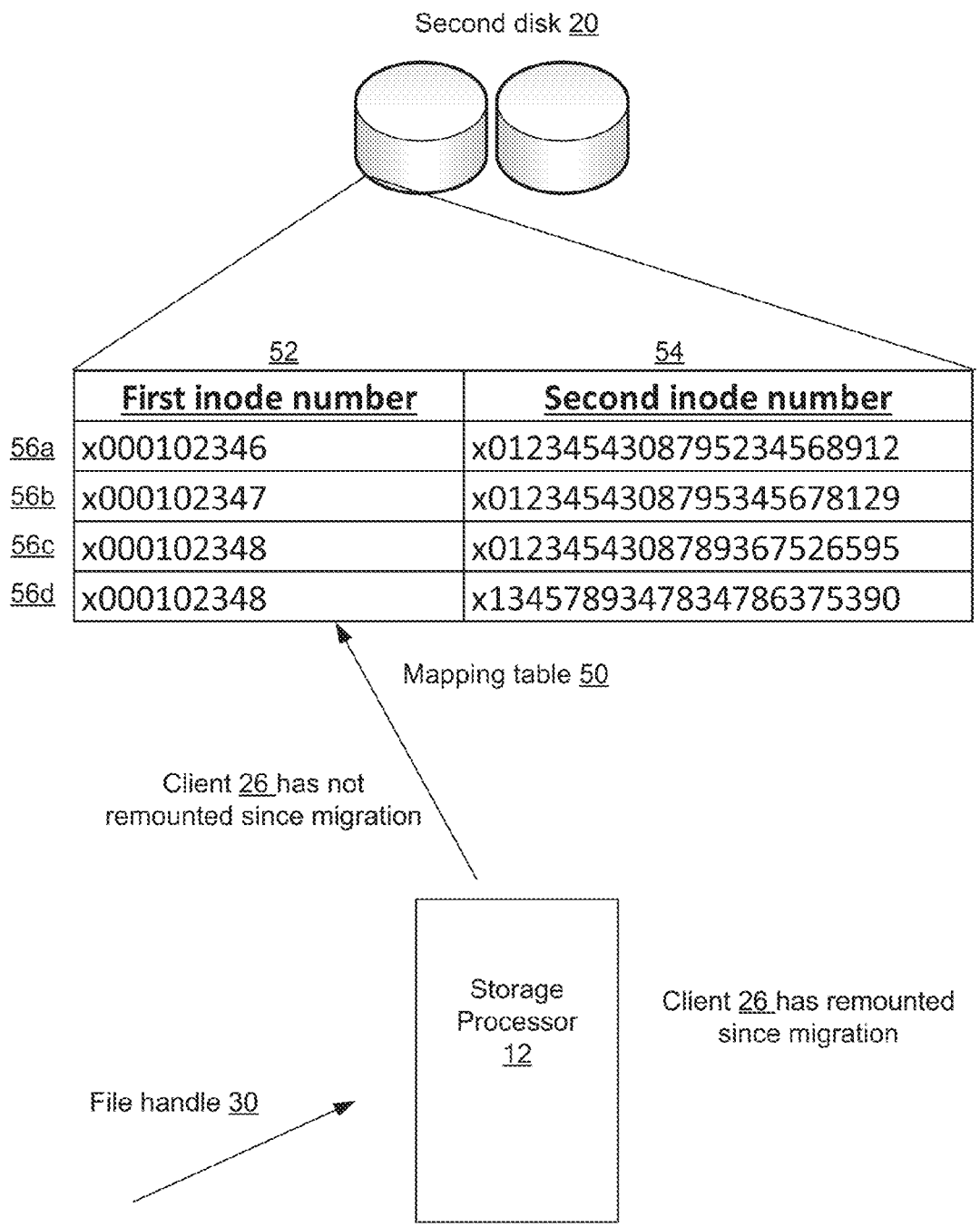
FIG. 2 is a block diagram illustrating an example mapping table used within the electronic environment shown in FIG. 1.

FIG. 2 illustrates how storage processor 12 reacts upon receiving file handle 30 within a request 28 (see FIG. 1) for access to file 22 (see FIG. 1). When storage processor 12 determines that client 26 has not remounted, then storage processor takes the inode number in file handle 30 to be first inode number 32. Storage processor 12 then performs a lookup operation on mapping table 50. The lookup operation on mapping table 50 serves to return a second inode number 44 given a first inode number 32. Once storage processor 12 extracts second inode number 44 from mapping table 50, then storage processor may extract information concerning file 22 from the inode at second inode number 44.

Mapping table 50 is stored in second disk array 20 in a predetermined location, e.g., the root directory that is known to storage processor 12. Mapping table 50 includes a set of entries 56, each containing a value of a first inode number field 52 and a value of a second inode number field 54. The values of first inode number field 52 are arranged in ascending order of value for faster lookup. The values of second inode number field 54 corresponding to first inode number field 52 indicate a physical location within second disk array 20 of an inode for a file stored in second disk array 20.

When storage processor determines that client 12 has remounted, on the other hand, then storage processor 12 extracts information concerning file 22 directly from the inode at that inode number from file handle 30. It should be understood that, because storage processor does not need to perform the lookup operation on mapping table 50, then the file access operation is faster than the above case in which a lookup operation on mapping table 50 is performed.

Further details concerning storage processor 12 are discussed below with respect to FIG. 3.

Figure 3:
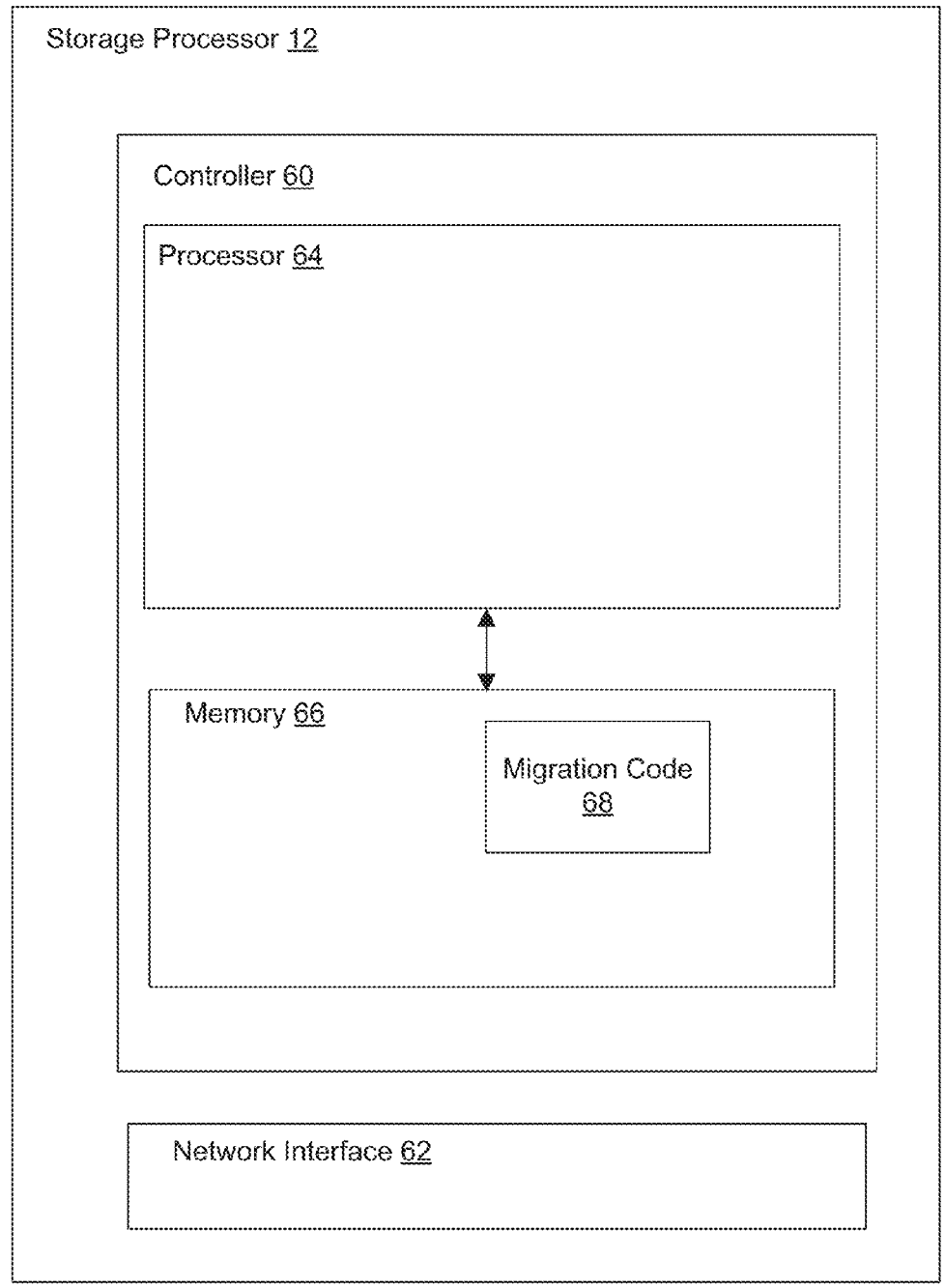
FIG. 3 is a block diagram illustrating an example storage processor within the electronic environment shown in FIG. 1.

FIG. 3 illustrates details of an example storage processor 12. Storage processor 12 includes controller 60, which in turn includes processor 64 and memory 66, and network interface 62.

Network interface 62 takes the form of an Ethernet card; in some arrangements, network interface 62 takes other forms including a wireless receiver and a token ring card.

Memory 66 is configured to store code 68 that contains instructions configured to cause the processor to carry out the improved technique. Memory 66 generally takes the form of, e.g., random access memory, flash memory or a non-volatile memory.

Processor 64 takes the form of, but is not limited to, Intel or AMD-based CPUs, and can include a single or multi-cores each running single or multiple threads. In some arrangements, processor 64 is one of several processors working together. Processor 64 is configured to determine whether client 26 has remounted. In some arrangements, processor 64 is also configured to perform a remounting operation on client 26. Further details of this remounting operation are described below with respect to FIG. 4.

Figure 4:
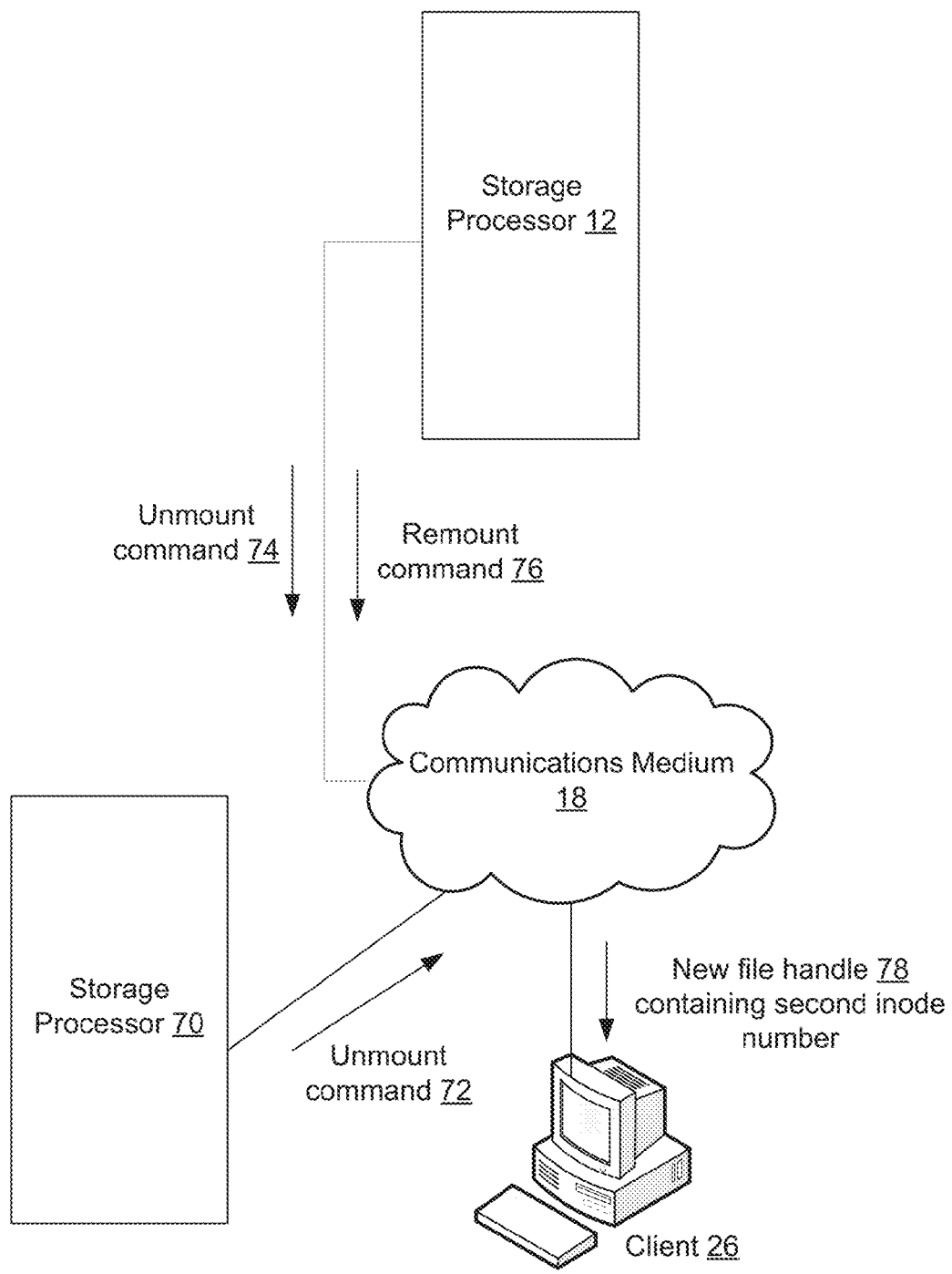
FIG. 4 is a block diagram illustrating an example remounting procedure within the electronic system shown in FIG. 1.

FIG. 4 illustrates a post-migration remounting process on client 26 involving storage processor 12 and a local storage processor 70. Local storage processor 70 is configured to provide client 26 access to file 22 by communicating with storage processor 12 over communication medium 18. An administrator (not pictured) operates local storage processor 70 and communicates with client 26 regarding the remounting process.

After the migration of the data completes, the first and second storage processors orchestrate the switchover from the first file system to the second file system. This is done in a way that clients are not disrupted (for example, the IP address being used is moved to the second SP). Accesses from the client are still using the original file handle acquired from the first storage processor using the first inode number. These are handled by the second processor using the mapping table to translate first inode numbers into second inode numbers. New file handles handed out would be using the first inode number.

In some arrangements, the storage processor is switched into a mode where the storage processor starts distributing the second inode numbers in file handles in response to client lookup requests. In this case, however, it may not be clear that, when a client presents a file handle for access the storage processor, he would need to be able to distinguish whether it was being handed a first or second inode number. This was where the idea of adding a bit into the file handle (perhaps high order bit of inode number) that would be set if the inode were a second inode number.

Along these lines, upon receiving unmount command 72, storage processor 12 sends unmount command 74 to local storage processor 70 to unmount from first file system 14. As part of command 74, storage processor 12 removes the mount point from storage of local storage processor 70.

Storage processor 12 then sends storage processor 70 a remount command 76 to mount to second file system 18. As part of command 76, storage processor 12 stores a mount point of second file system 18 in storage of local storage processor 70. Also part of command 76 is an option that file handles will be directed to an inode location specified by second inode number 44. Storage processor 12 then mounts second file system on client 26.

Once this remounting has been accomplished, storage processor 12 will create a file handle 78 from second inode number 44 in second directory entry 42 in second file system 40. When references to first file system 14 are no longer needed, storage processor 12 may delete mapping table 50 (see FIG. 2) and/or first inode number 32 from second directory entry 42. Further details of such a deletion from second directory entry 42 are described below with respect to FIG. 5.

Figure 5:
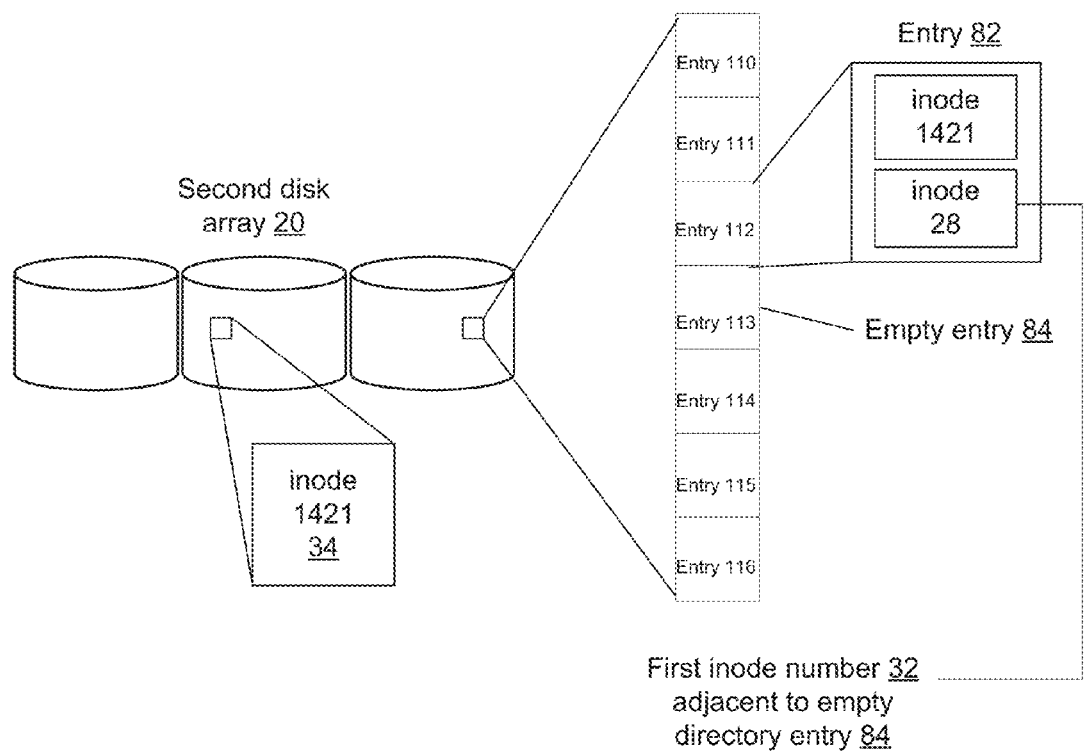
FIG. 5 is a block diagram illustrating an example directory entry within the electronic system shown in FIG. 1.

FIG. 5 illustrates an example second file system 18 that represents how a file is stored in second disk array 20. Specifically, the file has an inode 88 with number 1421 that represents the location of inode 88 in second disk array 20. In another location in second disk array 20, second file system 18 maintains a directory 24 with a directory entry 82 for the file.

Directory entry 82 contains two inode numbers: one that provides a location of the inode for the file in second file system 18, the other providing a location of the inode in first file system 14, here having a value of 28. Once client 26 has migrated, however, there is no need for the latter inode number to take up space in directory entry 82. Storage processor 12, then, may delete this inode number from directory entry 82.

Nevertheless, one may direct storage processor 12 to write this inode number in such a way as to use disk space efficiently. For example, as illustrated in FIG. 5, the inode number having value 28 is written adjacent to a hole, i.e., an empty directory entry. In this way, when storage processor 12 deletes this inode number from directory entry 82, the hole in the branch of the corresponding directory is bigger. That is, by deleting this inode number, storage processor 12 has created a larger contiguous space in disk. Advantageously, this larger space allows for more directory entries to be written.

Figure 6:
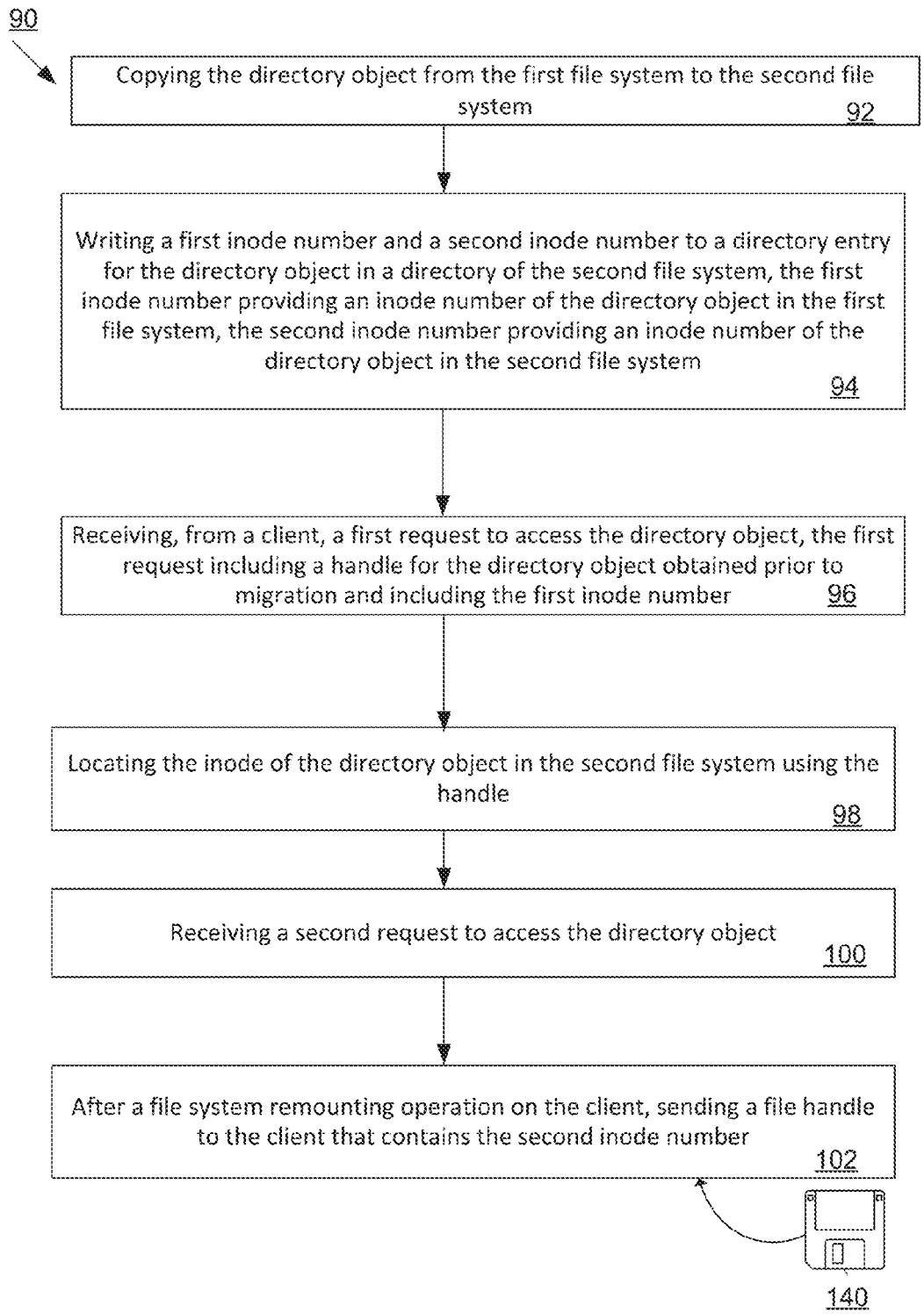
FIG. 6 is a flow chart illustrating an example method of carrying out the improved technique within the electronic environment shown in FIG. 1.

FIG. 6 illustrates a method 90 of migrating a directory object from a first file system to a second file system, including steps 92, 94, 96, 98, 100, and 102. In step 92, the directory object is copied from the first file system to the second file system. In step 94, a first inode number and a second inode number are written to a directory entry for the directory object in a directory of the second file system, the first inode number providing an inode number of the directory object in the first file system, the second inode number providing an inode number of the directory object in the second file system. In step 96, a first request to access the directory object is received from a client, the request including a handle for the directory object obtained prior to migration and including the first inode number. In step 98, the inode of the directory object in the second file system is located using the handle. In step 100, a second request to access the directory object is received. In step 102, a file handle is sent to the client that contains the second inode number after a file system remounting operation on the client.

While various embodiments of the invention have been particularly shown and described, it will be understood by those skilled in the art that various changes in form and details may be made therein without departing from the spirit and scope of the invention as defined by the appended claims.

For example, it was assumed in the above discussion that the migration was performed out-of-place; that is, the file system migrated when data was transported to a new disk array. It should be understood, however, that file system migration may be in-place; that is, the file system may change without data being moved. The improved technique described here is not affected by such a difference.

Moreover, it was assumed that the unmounting operation 72 was performed through local storage processor 70. In some arrangements, however, an administrator unmounts and remounts storage processor 12 as part of the remounting process for client 26.

Furthermore, it should be understood that some embodiments are directed to storage processor 12, which is constructed and arranged to migrate a directory object from a first file system to a second file system. Some embodiments are directed to a process of migrating a directory object from a first file system to a second file system. Also, some embodiments are directed to a computer program product which enables computer logic to migrate a directory object from a first file system to a second file system.

In some arrangements, storage processor 12 is implemented by a set of processors or other types of control/processing circuitry running software. In such arrangements, the software instructions can be delivered, within storage processor 12, in the form of a computer program product 140 (see FIG. 6), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-implemented method of managing a migration of a directory object from a first file system to a second file system, the directory object having an inode, the method comprising:
    copying the directory object from the first file system to the second file system;
    writing a first inode number and a second inode number to a directory entry for the directory object in a directory of the second file system, the first inode number providing an inode number of the directory object in the first file system, the second inode number providing an inode number of the directory object in the second file system;
    receiving, from a client, a first request to access the directory object, the first request including a handle for the directory object obtained prior to migration and including the first inode number;
    locating the inode of the directory object in the second file system using the handle;
    receiving a second request to access the directory object; and
    after a file system remounting operation on the client, sending a file handle to the client that contains the second inode number;
    wherein locating the directory object includes directing the file handle to a mapping table, the mapping table providing a mapping from the first inode number to the second inode number.

2. A method as in claim 1,
    wherein directing the file handle to the mapping table includes:
    reading the inode number from the file handle; and
    looking up the inode number from the file handle in the mapping table.

3. A method as in claim 1,
    wherein receiving the other request to access the directory object from the client includes:
    an indicator as to whether the client has performed the file system remounting operation.

4. A method as in claim 3,
    wherein directing the file handle to the mapping table includes:
    sending the file handle to the inode of the directory object in the second file system according to the indicator.

5. A method as in claim 1, further comprising:
    directing file handles away from the mapping table after the remounting procedure is performed on the client.

6. A method as in claim 5,
wherein the remounting procedure includes unmounting the second file system from a storage processor configured to provide the client access to the directory object after the storage processor unmounts the first file system from the client, and mounting the second file system back on the storage processor with an instruction indicating that file handles will be directed to an inode location specified by the second inode number, the storage processor mounting the second file system on the client;
wherein the method further comprises:
receiving a message that the remounting procedure was performed on the client.

7. A method as in claim 5, further comprising:
after the remounting procedure is performed on the client, deleting the first inode number from the directory entry.

8. A method as in claim 7,
wherein the directory entry includes multiple directory entry components for the directory object, each directory entry component corresponding to a different network protocol;
wherein writing the pair of inode numbers in the directory entry includes:
for each directory entry component of the directory object, writing the first inode number and the second inode number in the directory entry component, the first inode number being written in a location within the directory entry component adjacent to adjacent to an unused portion of the directory, wherein deleting the first node enlarges the unused portion of the directory.

9. An apparatus constructed and arranged to manage a migration of a directory object from a first file system to a second file system, the directory object having an inode, the apparatus comprising:
a network interface;
memory; and
a controller including controlling circuitry constructed and arranged to:
copy the directory object from the first file system to the second file system;
write a first inode number and a second inode number to a directory entry for the directory object in a directory of the second file system, the first inode number providing an inode number of the directory object in the first file system, the second inode number providing an inode number of the directory object in the second file system;
receive, from a client, a first request to access the directory object, the first request including a handle for the directory object obtained prior to migration and including the first inode number;
locate the inode of the directory object in the second file system using the handle;
receive a second request to access the directory object; and
after a file system remounting operation on the client, send a file handle to the client that contains the second inode number;
wherein locating the directory object includes:
directing the file handle to a mapping table, the mapping table providing a mapping from the first inode number to the second inode number.

10. An apparatus as in claim 9,
wherein directing the file handle to the mapping table includes:
reading the inode number from the file handle; and
looking up the inode number from the file handle in the mapping table.

11. An apparatus as in claim 9,
wherein receiving the other request to access the directory object from the client includes:
reading an indicator as to whether the client has performed the file system remounting operation.

12. An apparatus as in claim 11,
wherein directing the file handle to the mapping table includes:
sending the file handle to the inode of the directory object in the second file system according to the remounting bit of the file handle.

13. An apparatus as in claim 11, wherein the controlling circuitry is further constructed and arranged to:
direct file handles away from the mapping table after the remounting procedure is performed on the client.

14. An apparatus as in claim 13,
wherein the remounting procedure includes unmounting the second file system from a storage processor configured to provide the client access to the directory object after the storage processor unmounts the first file system from the client, and mounting the second file system back on the storage processor with an instruction indicating that file handles will be directed to an inode location specified by the second inode number, the storage processor mounting the second file system on the client;
wherein the method further comprises:
a message that the remounting procedure was performed on the client.

15. An apparatus as in claim 13, wherein the controlling circuitry is further constructed and arranged to:
after the remounting procedure is performed on the client, delete the first inode number from the directory entry.

16. A computer program product having a non-transitory, computer-readable storage medium which stores code for managing a migration of a directory object from a first file system to a second file system, the directory object having an inode, the code including instructions which, when executed by a computer, causes the computer to:
copy the directory object from the first file system to the second file system;
write a first inode number and a second inode number to a directory entry for the directory object in a directory of the second file system, the first inode number providing an inode number of the directory object in the first file system, the second inode number providing an inode number of the directory object in the second file system;
receive, from a client, a first request to access the directory object, the first request including a handle for the directory object obtained prior to migration and including the first inode number;
locate the inode of the directory object in the second file system using the handle;
receive a second request to access the directory object; and
after a file system remounting operation on the client, send a file handle to the client that contains the second inode number;
wherein locating the directory object includes:
directing the file handle to a mapping table, the mapping table providing a mapping from the first inode number to the second inode number.

17. A computer program product as in claim 16,
wherein directing the file handle to the mapping table includes:
reading the inode number from the file handle; and
looking up the inode number from the file handle in the mapping table.

* * * * *